United States Patent [19]
Kuno et al.

[11] Patent Number: 5,467,102
[45] Date of Patent: Nov. 14, 1995

[54] PORTABLE DISPLAY DEVICE WITH AT LEAST TWO DISPLAY SCREENS CONTROLLABLE COLLECTIVELY OR SEPARATELY

[75] Inventors: Yoshinori Kuno, Saitama; Noboru Tanabe; Koichi Hasebe, both of Kanagawa, all of Japan

[73] Assignee: Kabushiki Kaisha Toshiba, Kawasaki, Japan

[21] Appl. No.: 411,924

[22] Filed: Mar. 28, 1995

Related U.S. Application Data

[63] Continuation of Ser. No. 113,637, Aug. 31, 1993, abandoned.

[30] Foreign Application Priority Data

Aug. 31, 1992 [JP] Japan .................... 4-230732

[51] Int. Cl.$^6$ .................................... G09G 3/02
[52] U.S. Cl. ................ 345/1; 345/901; 345/903
[58] Field of Search .................. 345/1, 2, 3, 173, 345/179, 901, 903; 358/449

[56] References Cited

U.S. PATENT DOCUMENTS

| | | | |
|---|---|---|---|
| 4,159,417 | 6/1979 | Rubincam | 345/901 |
| 4,545,023 | 10/1985 | Mizzi | 345/173 |
| 4,631,596 | 12/1986 | Yaguchi | 358/449 |
| 4,746,981 | 5/1988 | Nadan | 345/1 |
| 4,876,657 | 10/1989 | Saito | 345/1 |
| 4,884,068 | 11/1989 | Matheny | 345/1 |
| 5,049,862 | 9/1991 | Dao | 345/179 |
| 5,128,662 | 7/1992 | Failla | 345/903 |
| 5,184,956 | 2/1993 | Langlais | 345/1 |

FOREIGN PATENT DOCUMENTS

| | | | |
|---|---|---|---|
| 2-77085 | 3/1990 | Japan | 345/3 |
| 2-257364 | 10/1990 | Japan . | |
| 3-217959 | 9/1991 | Japan . | |
| 9105327 | 4/1991 | WIPO | 345/173 |

Primary Examiner—Richard Hjerpe
Assistant Examiner—Matthew Luu
Attorney, Agent, or Firm—Foley & Lardner

[57] ABSTRACT

A portable display device capable of presenting a document in an easy to read format, in which a simultaneous display of different parts of the document in reasonable sizes can be made, by a simple operation of the device. The display device comprises a document memory for storing documents to be displayed, at least two display screens for displaying the documents stored in the document memory means, and a display control unit for controlling displays of the documents on the display screens to be in a linked mode in which the displays on the display screens are linked together and in a separate mode in which the displays on the display screens are independent from each other.

22 Claims, 14 Drawing Sheets

FIG. 7A
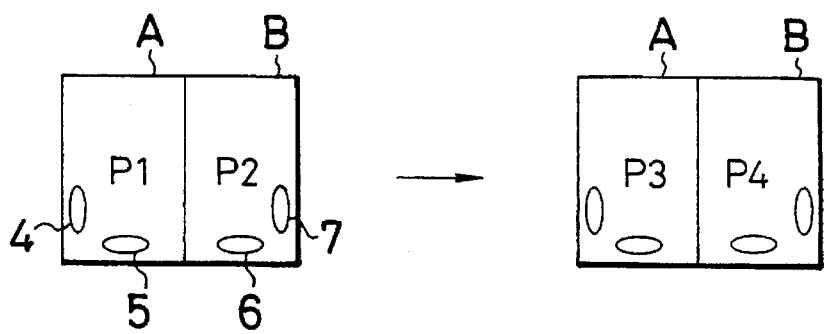
FIG. 7B
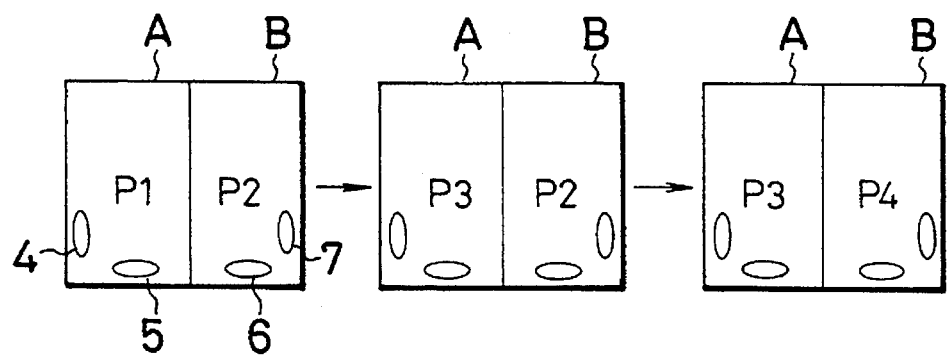
FIG. 8A  FIG. 8B  FIG. 8C
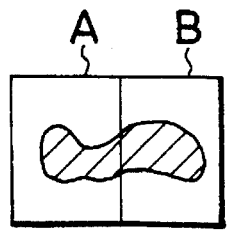 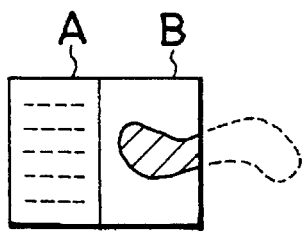 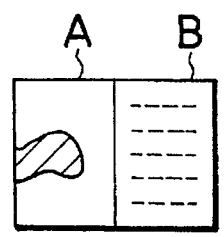

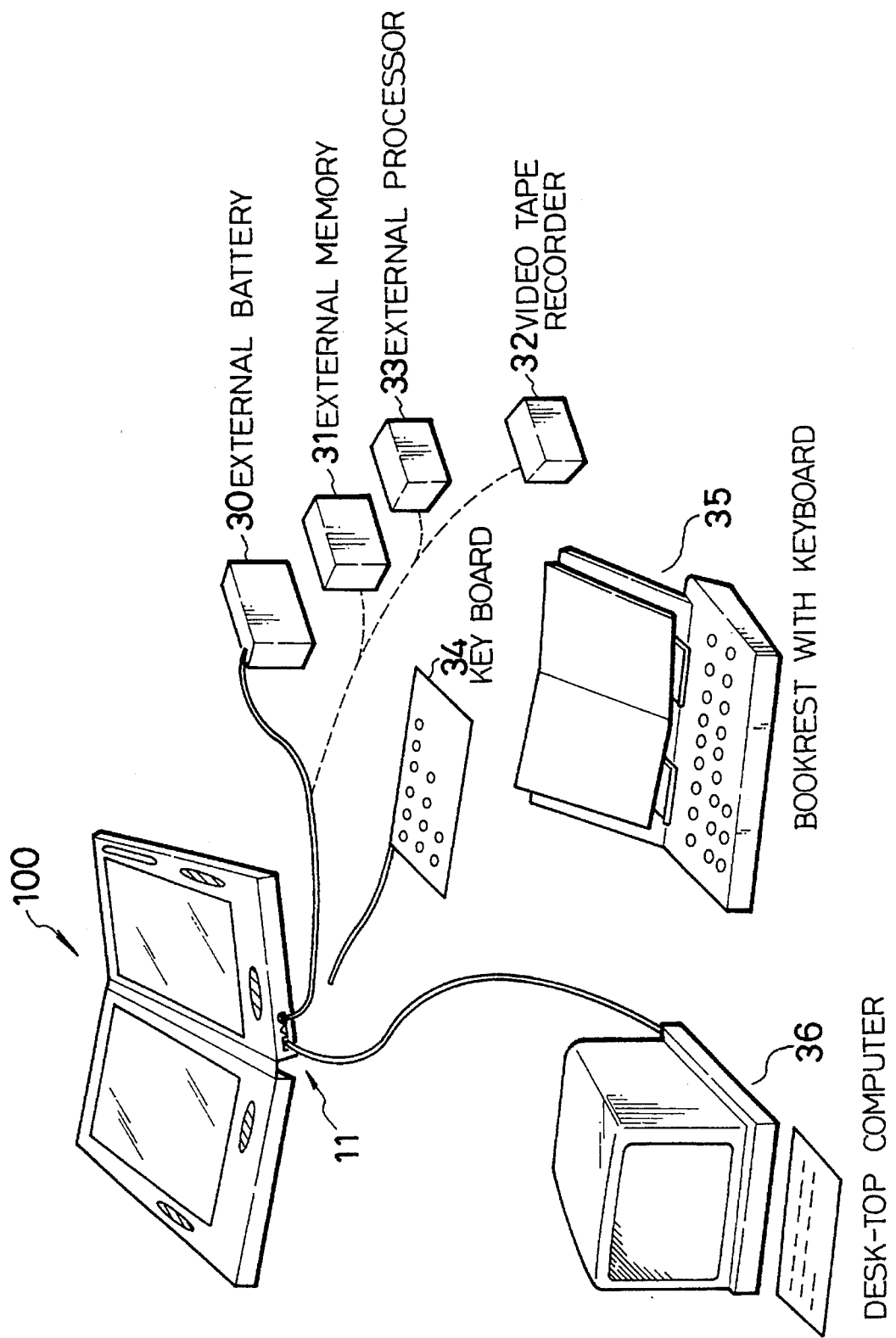

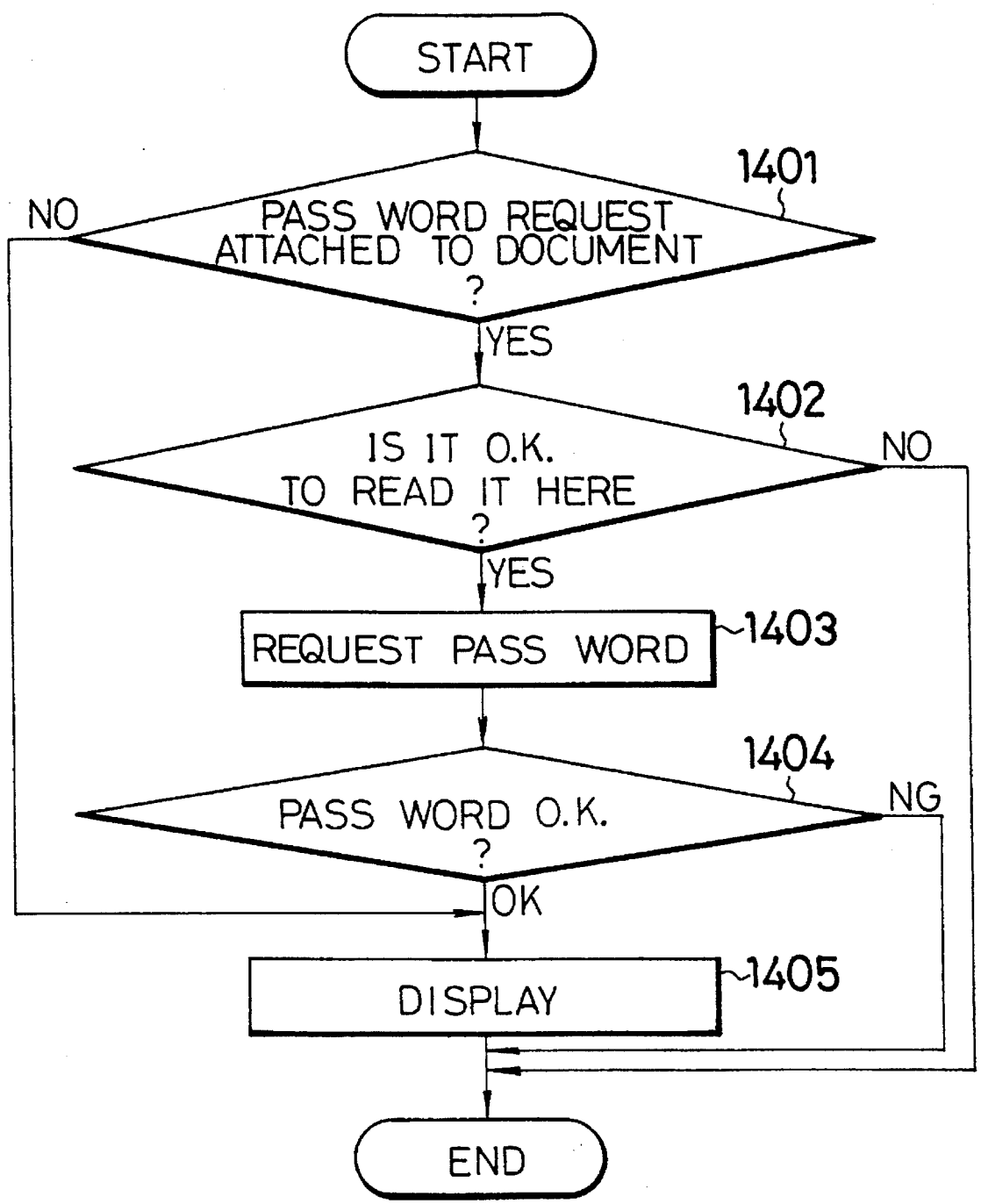

PORTABLE DISPLAY DEVICE WITH AT LEAST TWO DISPLAY SCREENS CONTROLLABLE COLLECTIVELY OR SEPARATELY

This application is a continuation of application Ser. No. 08/113,637, filed Aug. 31, 1993, now abandoned.

BACKGROUND OF THE INVENTION

1. Field of the Invention

The present invention relates to a display device for displaying documents containing text and other data for the sake of reading of the documents.

2. Description of the Background Art

A conventional portable computer device has been equipped with a display facility comprising a single display screen. In this conventional display facility, when a long text which cannot be contained entirely within this single display screen is to be read, it has been necessary to use the scroll function such that the displayed portion can be shifted sequentially.

Now, when there is a figure in the document followed by a lengthy explanation of this figure, there is a possibility that the figure itself moves out of the display screen and therefore cannot be seen while a reader reads through this lengthy explanation. Similarly, when the explanation of the symbols to be used in the later parts of the document Is given collectively in an earlier part of the document, until the reader gets thoroughly familiar with the symbols, the reader must go back to the earlier part very frequently while reading the later parts.

In these circumstances, if the document is presented in a form of a book, the reader can mark the earlier part to be looked back easily by means of a finger or a bookmarker, so that the reader can go back and forth between the earlier part and the presently reading part very easily. However, in a case of an electronic display device such as that provided on a conventional portable computer device, it is quite cumbersome to switch the displayed pages frequently, and in addition it is difficult to read smoothly as the earlier part and the presently reading part cannot be seen simultaneously.

This difficulty can be resolves by using the multi-window function, such that two different parts of the document can be displayed simultaneously in two different windows. Here, the multi-window function can be furnished either by dividing the display screen or by allowing an overlap of one window over another.

In a case of dividing the display screen, the displayed content of each window remains entirely visible within each window so that the problem concerning the impossibility of the simultaneous display of two different parts can be resolved, but because the display screen itself has a limited size especially in a portable computer device, the amount of data that can be presented in each window at any one moment is rather limited, such that the overview of the entire document is hard to comprehend and it actually requires a longer time to read the document.

On the other hand, in a case of using a plurality of windows in overlap, when the amount of data that can be presented in one window is increased, the overlapped portion becomes large and the displayed content of the overlapped window becomes invisible, so that the problem concerning the impossibility of the simultaneous display of two different parts cannot be resolved.

Moreover, in either case, the reader is required to carry out the manipulations of the windows, which can be quite cumbersome.

SUMMARY OF THE INVENTION

It is therefore an object of the present invention to provide a portable display device capable of presenting a document in an easy to read format, in which a simultaneous display of different parts of the document in reasonable sizes can be made, by a simple operation of the device.

This object is achieved in the present invention by providing a display device, comprising: document memory means for storing documents to be displayed; at least two display screens for displaying the documents stored in the document memory means; and display control means for controlling displays of the documents on the display screens to be in a linked mode in which the displays on the display screens are linked together and in a separate mode in which the displays on the display screens are independent from each other.

Other features and advantages of the present invention will become apparent from the following description taken in conjunction with the accompanying drawings.

BRIEF DESCRIPTION OF THE DRAWINGS

FIGS. 7A and 7B are sequential illustrations of both sides switching mode and one side switching mode in the display device of FIG. 1.

FIGS. 8A, 8B, and 8C are illustrations of various displays in the linked mode in the display device of FIG. 1.

FIG. 11 is an illustration of various external devices connected with the display device of FIG. 1.

FIG. 13 is a flow chart for a secret protection operation at a time of displaying of the document in the display device of FIG. 1.

DETAILED DESCRIPTION OF THE PREFERRED EMBODIMENTS

Figure 1:
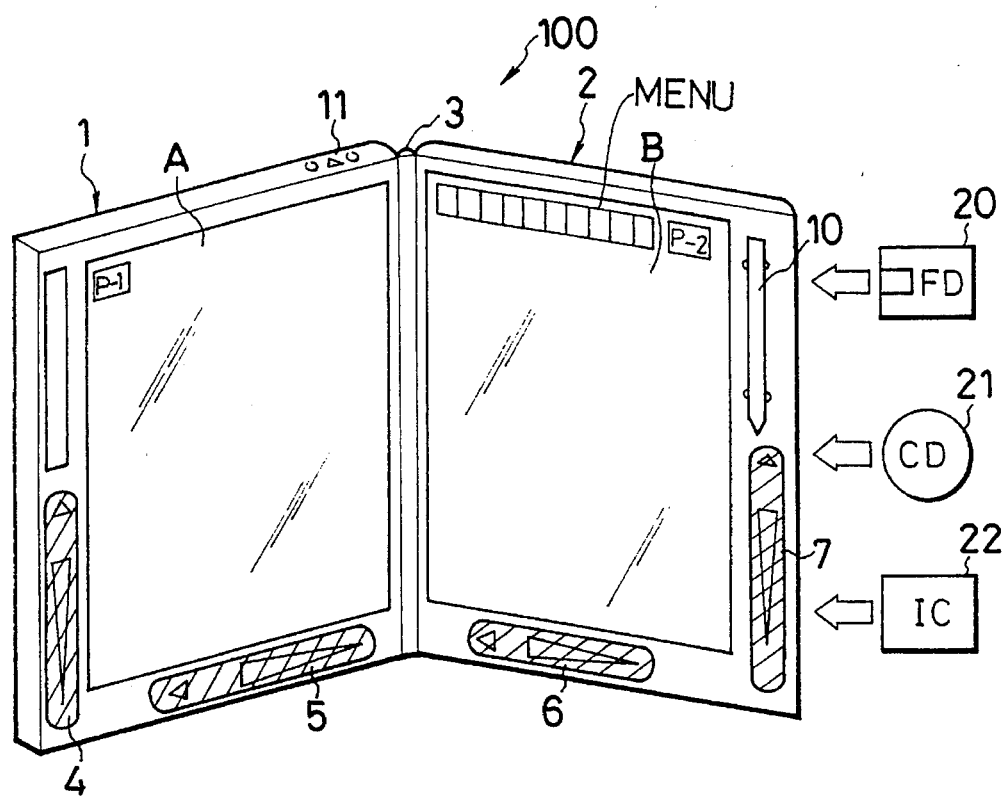
FIG. 1 is a schematic perspective view of one embodiment of a portable display device according to the present invention.

Referring now to FIG. 1, one embodiment of a portable display device according to the present invention will be described in detail.

In this embodiment, the display device 100 generally comprises two left and right display screen units 1 and 2 which define display screens A and B, and which are attached together by a hinge 3 provided therebetween to be freely spread out flat or folded up in half. On edges of these display screen units 1 and 2, there are also provided a plurality of operation buttons 4 to 7, at positions at which a thumb is going to be located when the device 100 is held in a manner of holding a book. In a configuration shown in FIG. 1, the operation buttons 4 and 7 are provided on a lower left edge of the display screen unit 2 and a lower right edge of the display screen unit 1, respectively, while the operation buttons 5 and 6 are provided on central bottom edges of the display screen units 2 and 1, respectively. A number of these operation buttons may be increased or decreased according to the need.

In addition, the device 100 is further equipped with an electronic pen 10 to be used for a handwriting input and a menu selection on the display screen units 1 and 2, and an external device connector 11 for connecting this display device 100 with external devices. The external device connector 11 may be provided on a bottom edge of either one of the display screen units 1 and 2 instead of a top edge of one of the display screen units 1 and 2 as shown in FIG. 1, such that a connection code to be connected at the external device connector 11 would not obstruct the operations to be made by the user.

Figure 2A:
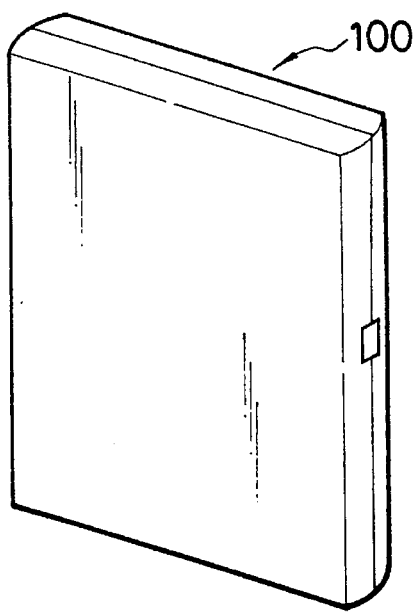
FIG. 2A is a perspective view of the display device of FIG. 1 in a state of folding the display screens face to face.

As shown in FIG. 2A, the display screen units 1 and 2 can be folded up completely, face to face with each other, such that the display device 100 can be carried in hands easily while protecting the display screens A and B of the display screen units 1 and 2 as well as the operation buttons 4 to 7.

Figure 2B:
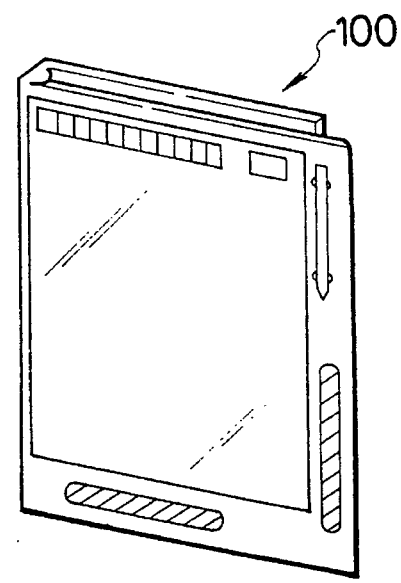
FIG. 2B is a perspective view of the display device of FIG. 1 in a state of folding the display screens back to back.

Also, as shown in FIG. 2B, the display screen units 1 and 2 can be folded up completely, back to back with each other, such that the display device 100 can be held in one hand while operating the display device 100. Here, it is possible to provide a switch mechanism for detecting such a folding of the display screen units 1 and 2 back to back, and erasing the display on one of the display screen units 1 and 2 that is to be a back side (the default setting is the display screen unit 1 which comes to the left side in the spread). With such a switch mechanism, the secrecy of the displayed content can be maintained with respect to the surrounding people to whom the back side display screen is visible, and in addition, an unnecessary battery power can be saved such that the display device 100 can remain in an operable state for a longer period of time. It is also possible to make each one of the display screen units 1 and 2 to be capable of being activated/inactivated (i.e., turned on/off) separately such that the unnecessary battery power can be saved by inactivating an unnecessary one of the display screen units 1 and 2 whenever possible.

Figure 3:
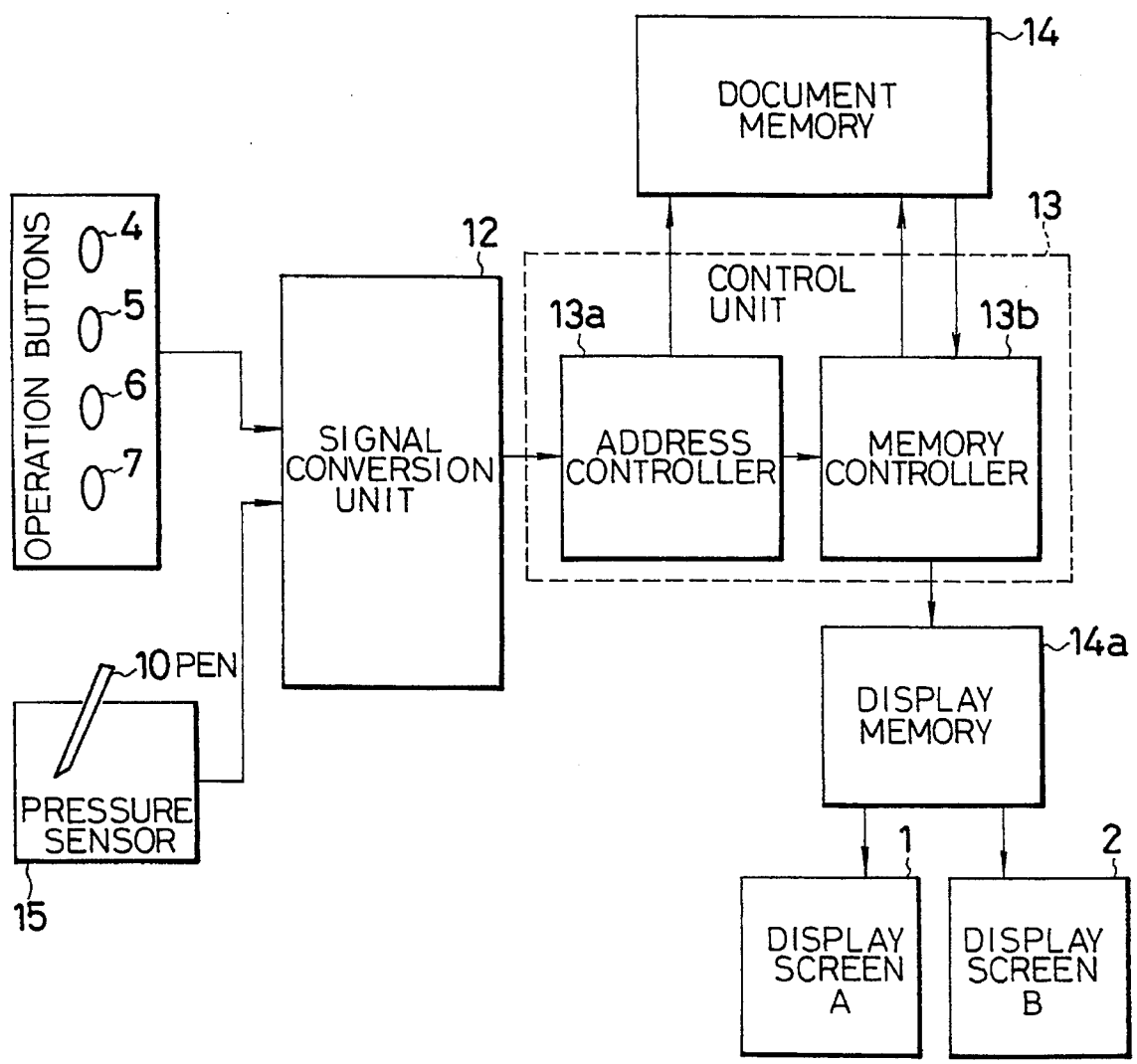
FIG. 3 is a schematic block diagram of the display device of FIG. 1.

The display device 100 has an internal configuration as shown in FIG. 3, which is similar to that of a usual micro-computer device except for the presence of the two display screens A and B and various operation switches. The commands entered from the input means such as the operation buttons 4 to 7 and a pressure sensor 15 provided over the display screens A and B are converted into appropriate electric signals at a signal conversion unit 12 and the obtained electric signals are supplied into a control unit 13. The control unit 13 includes an address controller 13a for specifying an appropriate address of a document memory 14 storing the documents to be displayed, and a memory controller 13b for accessing the document memory 14 and reading out the appropriate document data stored at the address specified from the address controller 13a to a display memory 14a through which the read out document data can be displayed on the display screens A and B of the display screen units 1 and 2.

Here, the document memory 14 can be provided in a form of a built-in semiconductor memory, as well as in an external memory device In various media such as a floppy disk (FD) 20, an optical disk (CD) 21 such as a compact disk, and an IC card (IC) 22, as shown in FIG. 1. The control unit 13 also has a function of interpreting the settings of the various operation switches provided in this display device 100.

Figure 4:
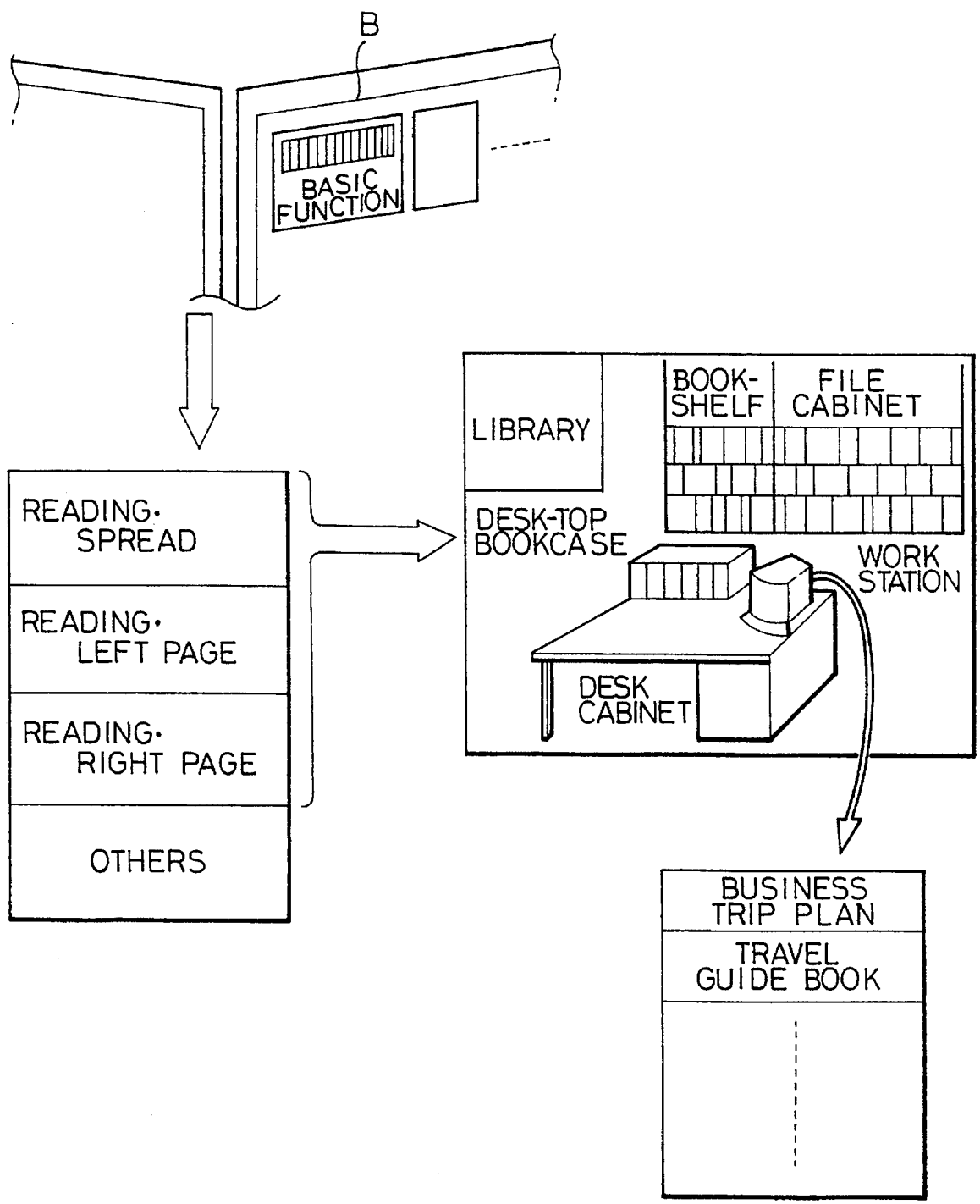
FIG. 4 is an illustration of a basic function menu used in the display device of FIG. 1.

In this display device 100, the most basic function of reading is selected by pressing an icon for the basic function provided on the display screen B with a finger or the electronic pen 10, as shown in FIG. 4. When this icon is pressed, the menu for selecting a reading with both of the display screens A and B (spread), or a reading with only one of the display screens A and B (left page, right page) is displayed. An entry "others" to be selected in a case of using the additional functions other than the basic function is also provided in this menu. When any one of the entries related to the basic function of reading is selected by pressing it with a finger or the electronic pen 10, a menu for selecting the document to be displayed is displayed. This menu shows illustrations of usual locations for the documents such as books and files. For example, the frequently used books are located in the desk-top bookcase, the specialized books are located in the library, the privately collected books are located in the bookshelf. In addition, the currently working documents are located in the work station, the recently used files are located in the desk cabinet, and the less frequently used files are located in the file cabinet. When a desired one of these locations of the documents is selected by pressing it with a finger or the electronic pen 10, a menu for selecting the documents contained at the selected location is displayed, from which a desired document to be displayed can be selected by pressing an entry for that desired document with a finger or the electronic pen 10.

When the desired document to be displayed is selected, the content of this selected document is displayed, on both of the display screens A and B when the "reading•spread" has been selected, or on either one of the display screens A and B when the "reading•left page" or "reading•right page" has been selected.

Here, the default setting for a page of the document to be displayed initially is set to be either the last page read in the last reading of this document in a case this document had been read previously but not finished to the end, or the first page of the document in a case this document has not been read previously or this document had been read to the end before. This can be furnished by recording in each document file the position (page) that is on the display screens A and B at a time of closing of the display of each document file, and reading this information at a time of opening of the display of each document file to set the initial display page according to this information. Also, in a case the power of the display device 100 itself had been turned off during the previous reading of the document, the situation of the reading of this document at a time the power had been turned off is resumed.

Figure 5:
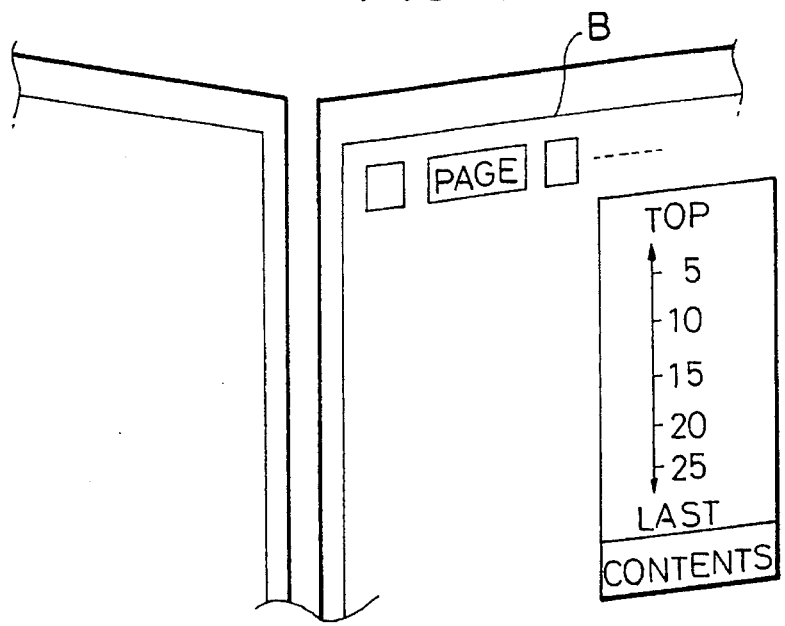
FIG. 5 is an illustration of a page menu used in the display device of FIG. 1.

In a case of changing the displayed page, a page menu provided on the display screen B is selected as shown in FIG. 5. When this page menu is selected, a page scale indication is displayed as shown in FIG. 5, such that when the user specifies a rough position of the desired page on this page scale indication with a finger or the electronic pen 10, the address controller 13a controls the the memory controller 13b to display the page at a specified position by skipping the intermediate pages. This page menu also has the "contents" entry for displaying the contents of the document. When this "contents" entry is selected, the user can specify the index of the desired section to be displayed in the displayed contents with a finger or the electronic pen 10, in response to which the appropriate page of the specified section is displayed.

Normally, the document is read page by page. However, in a case of ruffling the pages, the operation buttons 4 to 7 are used. These operation buttons 4 to 7 can be provided in forms of mechanical switches or pressure sensors. The displayed page can be changed by pressing these operation buttons 4 to 7 with a finger such as a thumb or an index finger. Each of these operation buttons 4 to 7 has a primary function of moving the pages ahead provided by an elongated triangular button shown in FIG. 1, as well as a secondary function of moving the pages back provided by a small triangular button shown in FIG. 1. A brief pressing of any of these operation buttons 4 to 7 moves the pages by one, while the continued pressing of any of these operation buttons 4 to 7 moves the pages continuously. In a case of using the pressure sensor for these operation buttons 4 to 7, the speed of moving the pages can be changed according to the strength at which these operation buttons 4 to 7 are pressed.

Figure 6:
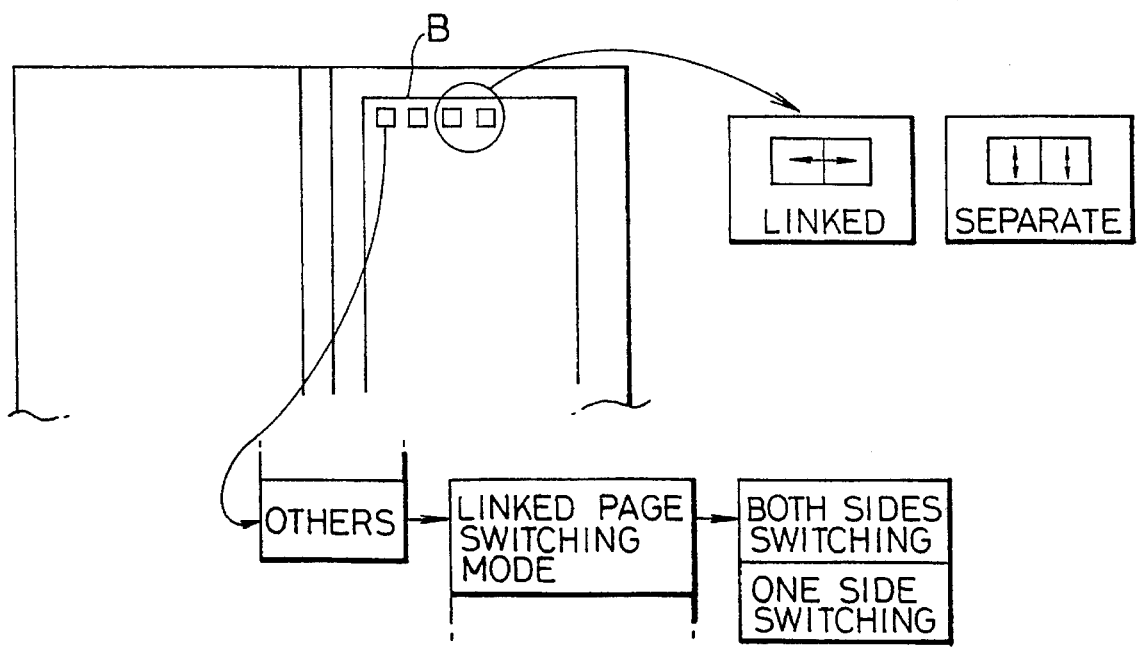
FIG. 6 is an illustration of page manipulation mode selection icons and linked page switching mode selection sub-menu.

There are two major page manipulation modes provided in this display device 100, including a left and right linked mode and a separate mode. The selection of the page manipulation mode is an important factor in the operation of this display device 100, so that the dedicated icons for both of these page manipulation modes are provided at an upper portion of the display screen B as shown in FIG. 6, and the selection of the page manipulation mode can be made by pressing an appropriate one of these icons on the display screen B. The selected one of these icons is indicated by a color or a positive-negative reversing, so that the user can easily recognize the current setting of the page manipulation mode.

The linked mode is a mode in which the left and right pages are moved together integrally, which is used for a usual reading the document. In this linked mode, there are two ways of linked page switching including the both sides switching and the one side switching, which can be selected according to the preference of each user. The setting of this linked page switching mode can be made by selecting the "others" entry in the basic function menu and then selecting a sub-menu for this linked page switching mode as shown in FIG. 6.

As shown in FIG. 7A, in a case of the both sides switching mode, after the reading of the pages displayed on both of the display screens A and B are finished, both of these displayed pages (P1 and P2) can be switched to the next pages (P3 and P4) by the pressing of any one of the operation buttons 4 to 7. This both sides switching mode is suitable for the reading with the entire display device 100 placed within the view field of the user.

On the other hand, as shown in FIG. 7B, in a case of the one side switching mode, the earlier page among the pages displayed on both of the display screens A and B is switched to a new page when any one of the operation buttons 4 to 7 is pressed. Thus, in this one side switching mode, any one of the operation buttons 4 to 7 can be pressed after the reading of the earlier page is finished and while reading of the later page is still in progress, such that the already read one of the displayed pages can be switched to the next page while the other page is read and there is no need to wait for the switching of the displayed pages after the reading of the other page is finished.

Here, it is also possible set the operation buttons 4 to 7 such that, when one of the operation buttons 4 and 5 on the left display screen unit 1 and one of the operation buttons 6 and 7 on the right display screen unit 2 are pressed simultaneously, both of the displayed pages can be switched in the manner of the both sides switching mode even when it is in the separate mode.

The separate mode is a mode in which the left and right pages can be moved independently from each other. This separate mode is apparently used when two different documents are to be displayed on the left and right display screens A and B in the basic function menu, but this separate mode can also be used conveniently in a case of displaying the same document on the left and right display screens A and B as follows.

For example, in a case of reading the document in the linked mode, when there is a figure or an explanation of symbols and the topics related to such a figure or an explanation of symbols are going to appear in the following pages, the separate mode can be selected to switch only the page without a figure or an explanation of symbols while keep displaying the page with a figure or an explanation of symbols. This can be achieved by pressing only one of the operation buttons provided on the display screen unit of the page to be switched. After the topics related to such a figure or an explanation of symbols are over, the linked mode can be resumed to display the currently reading pages on both of the display screens A and B. In this manner, the reading of the document can be assisted by the viewing of the relevant figures.

As another example, in a case of reading the document in the linked mode, when it is desired to refer back to the earlier part that has already been read, the separate mode can be selected to switch only one of the pages to display the earlier part while keep displaying the currently reading part on the other one of the pages. After the referring back to the earlier part is finished, the linked mode can be resumed to display the currently reading pages on both of the display screens A and B.

In a case of moving the pages fast by pressing the operation buttons strongly, only the header and the figure or table are displayed. In a case of moving the pages even faster, the figure or table is abbreviated to its outline. Also, in a case of ruffling the pages, the speed of the change of the display can be made faster by displaying only a part of each page, just as when the pages of the book are ruffled without opening the book completely.

Also, the operation of the control unit 13 can be adjusted according to the strength by which the operation buttons are pressed, such that the pages can be moved in units of 5 pages for the strongest pressing and in units of 1 page for the light pressing, for example.

In addition to the basic display function described above, this display device 100 is also equipped with a wide display function in which the left and right display screens A and B are treated as a single display. This wide display function is used in a case the document itself is given in the spread format as in the wide figures, or in a case the widened display of the normal single page is desired such that the letters can be enlarged. In the former case, the document data contain the code for requiring the widened display, so that the wide display function can be activated automatically in response to this code. Here, however, in a case the display device 100 itself has been operated in the single display mode with only one of the display screens A and B, only a half of the page in the spread format will be displayed on that single display screen, unless the operation to switch the display mode to the double display mode is made.

Now, in this display device 100, unlike the usual book using papers, what's on the left page and what's on the right page may not necessarily be stable depending on the manner of page manipulation during the reading. Namely, there is a case in which a figure given in the spread format as shown in FIG. 8A appears in a middle of the straightforward page by page reading at such a position that only the right display screen B becomes available for this figure in the spread format while the left display screen A must be used for displaying the immediately previous text as shown in FIG. 8B. At this point, when one of the operation buttons 4 to 7 is pressed in the usual linked mode, both of tile left and right pages are switched to next pages, so that only the left display screen A becomes available for this figure in the spread format while the right display screen B must be used for displaying the immediately following text as shown in FIG. 8C, such that only a half of this figure in the spread format can be displayed at any moment, and the entire figure will not be displayed properly. In such a case, the address controller 13a recognizes the code requiring the widened display contained in the document data and operates in the fine adjustment mode to display the entire figure in the spread format properly as shown in FIG. 8A.

In a case the widened display of the normal single page is desired, the user is required to carry out the following operation. Namely, the user must selects the "others" entry in the basic function menu and a sub-menu for the wide display function. In this case, the display device 100 is used in an orientation which is rotated from the normal orientation by 90° either in the clockwise direction or in the counter-clockwise direction. Here, if the operation buttons are also provided on the upper edges of the left and right display screen units 1 and 2, the display device 100 can be rotated in either one of the clockwise and counter-clockwise directions freely. However, when the operation buttons 4 to 7 are provided as shown in FIG. 1, whether to rotate the display device 100 in the clockwise direction or in the counter-clockwise direction can be determined according to one of the left and right hands that the user wishes to use for the manipulation of the operation buttons. Namely, when the user wishes to use the left hand for the manipulation of the operation buttons, the display device 100 must be rotated in the clockwise direction, whereas when the user wishes to use the right hand for the manipulation of the operation buttons, the display device 100 must be rotated in the counterclockwise direction.

In a case of the wide display function described above, there arises the problem of the display at the border of the display screens A and B. Namely, the display content located on the border of the display screens A and B must be divided Into two, but when the small letters are located on the border of the display screens A and B, the dividing of the small letters into two makes it difficult to read. In this display device 100, this problem is resolved as follows.

Namely, the display content is parallely shifted to displace the small letters from the border of the display screens A and B. Here, the dividing of the large letters or the figures would not severely damage the readability of the document, so that this parallel shifting is made only when the letters smaller than a prescribed size are located on the border of the display screens A and B. Here, the small letters means the normal sized letters without any ornamentation or enlargement.

Figure 9:
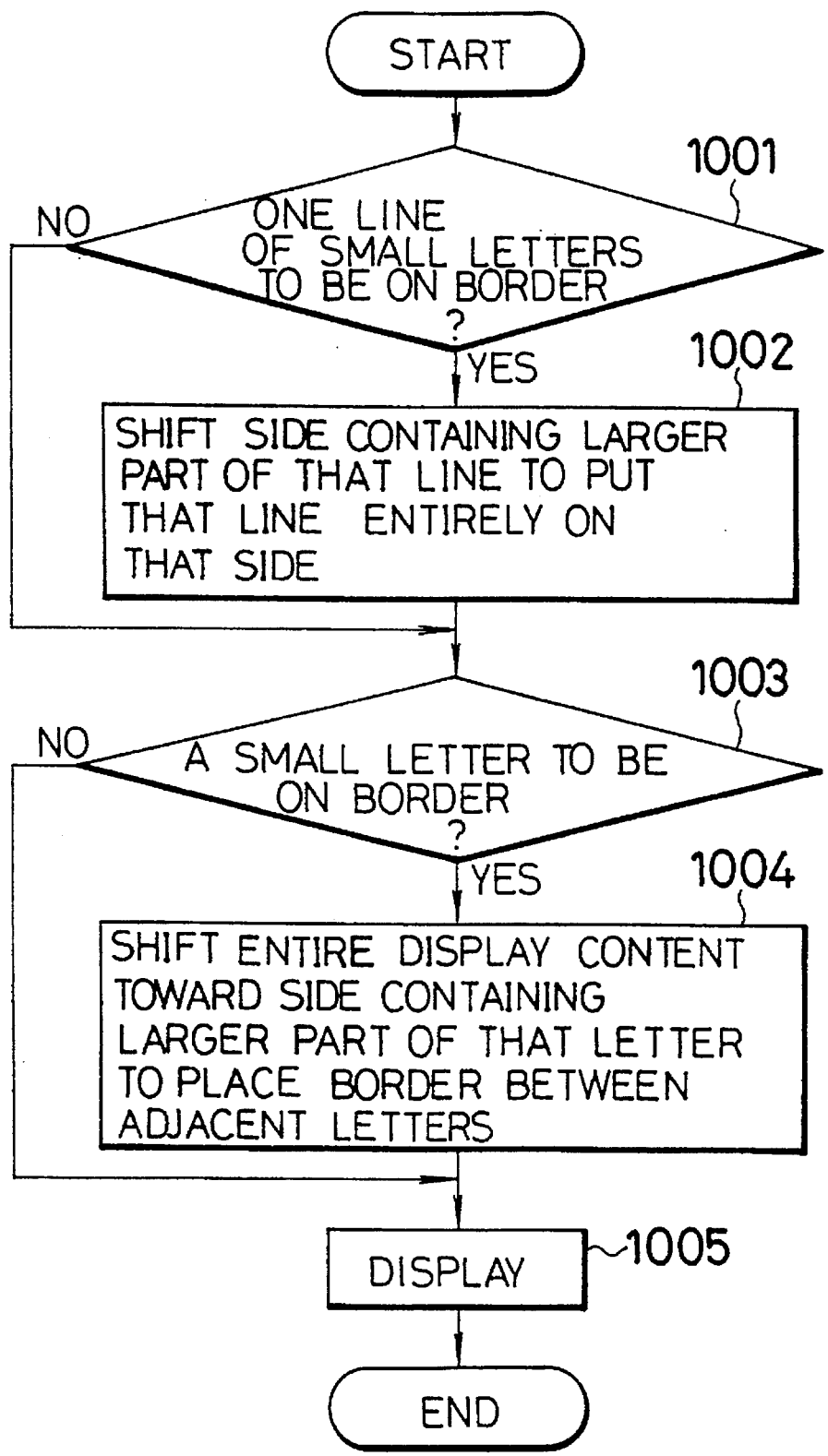
FIG. 9 is a flow chart for a border treatment operation in a case of a wide display function in the display device of FIG. 1.

This parallel shifting is achieved by the control unit 13 according to the flow chart of FIG. 9 as follows.

Figure 10A:
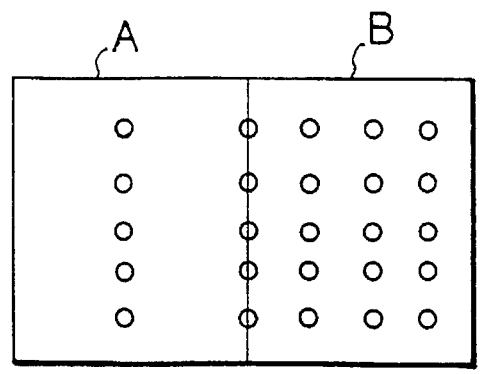
FIGS. 10A and 10B are illustrations of two displays in the wide display function requiring the border treatment operation in the display device of FIG. 1
Figure 10B:
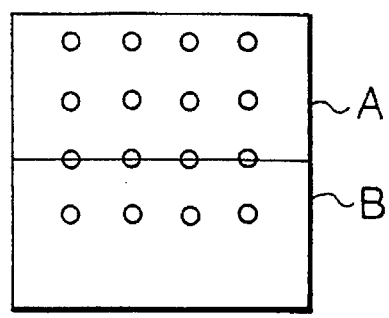

First, at the step 1001, whether one line (either a row or a column) of small letters is going to come on the border when the document is displayed straightforwardly or not is checked. In other words, the occurrence of situation as shown in FIG. 10A or 10B in which the entire line of the small letters comes on the border is detected. If this is not the case, the process proceeds to the step 1003. On the other hand, when this is the case, next at the step 1002, the entire display content on the side which contains larger part of that line of the small letters (display screen A in FIGS. 10A and 10B) is shifted to put that line of the small letters entirely within that side. In general, the document has some margins at the edges, so that this shifting does not cause any inconvenience.

Figure 10C:
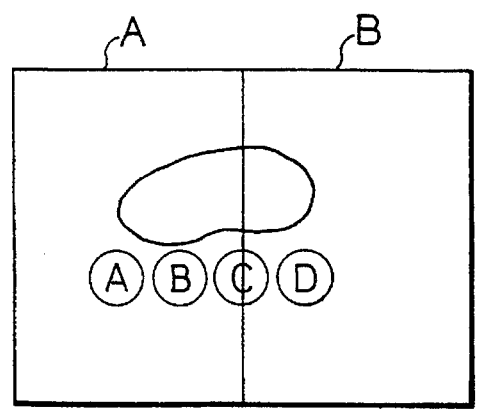
FIGS. 10C and 10D are illustrations of a display in the wide display function before and after the border treatment operation in the display device of FIG. 1
Figure 10D:
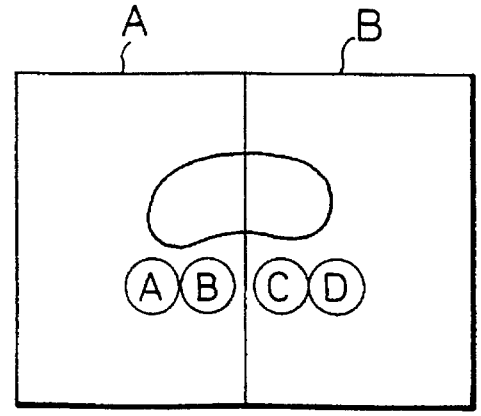

At the step 1003, whether a small letter of an isolated letter series is going to come on the border when the document is displayed straightforwardly or not is checked. In other words, the occurrence of situation as shown in FIG. 10C in which the small letter "C" of the isolated letter series "ABCD" comes on the border is detected. If this is not the case, the process proceeds to the step 1005. On the other hand, when this is the case, next at the step 1004, the entire display content on both sides are shifted toward the side which contains larger part of that small letter (display screen B in FIG. 10C) to place the border between the adjacent small letters, as shown in FIG. 10D. Alternatively, because the isolated letter series usually have some margin spaces around themselves, the isolated letter series alone may be shifted instead of the entire display content.

Finally, after the shifting at the steps 1002 and 1004 are made, the actual display is carried out.

Here, by storing the result of the shifting in the document memory 14 through the memory controller 13b, this shifting operation becomes unnecessary in the later reading occasions. Alternatively, the document data to be stored in the document memory 14 may be subjected to this shifting operation in advance, either by using this display device 100 or the other device capable of carrying out the same operation, such that there is no need to carry out this shifting operation at a time of actual display and therefore the proper display can be obtained more quickly.

Now, this display device 100 can be used in conjunction with various external devices connected at the external device connector 11, as shown in FIG. 11. For the connection, the cables and cords are used in FIG. 11, although the radio transmission type connection using lights such as infrared rays or electromagnetic waves may be used instead. Among the external devices shown in FIG. 11, an external battery 30 is useful for the extended outdoor use of this display device 100. Also, the external memory 31 such as an optical disk device which records a large number of documents and dynamic images can be connected for the purpose of viewing these documents and dynamic images on this display device 100. Also, the video tape recorder 32 can be connected for the purpose of viewing the video image on this display device 100. Also, the external processor 33 can be provided to separate those functions of the display device 100 other than the basic display functions, such that the display device 100 itself can be made so light weighted as to be practically portable.

In addition, the keyboard 34 can be connected as the input device. Moreover, when this display device 100 is used in conjunction with the bookrest equipped with the keyboard, on which this display device 100 can be mounted, this display device 100 can be used in the manner of a usual desk-top computer.

Furthermore, the other computer such as a desk-top personal computer or a work station 36 can be connected such that the document entered from the computer 36 can be viewed on this display device 100. Here, for example, even when the user is working in the office equipped with the desk-top personal computer 36, in a case the user wishes to recline on the seat to relax himself while reading the document, it is more convenient to use this display device 100 held in hand rather than the display device attached to the desk-top personal computer 36. In this case, the document to be displayed is supplied from the desk-top personal computer 36 rather than the document memory 14.

Another purpose for connecting the other computer is to transfer the documents from that other computer to the display device 100, and to take the display device 100 outside, such that the documents of the other computer can be viewed even when the user is away from that other computer. In this case, as the display device 100 is taken outside, there arises a need to be cautious about the handling of the secret documents. In this display device 100, the following mechanism is provided for the purpose of the secret protection.

Figure 12:
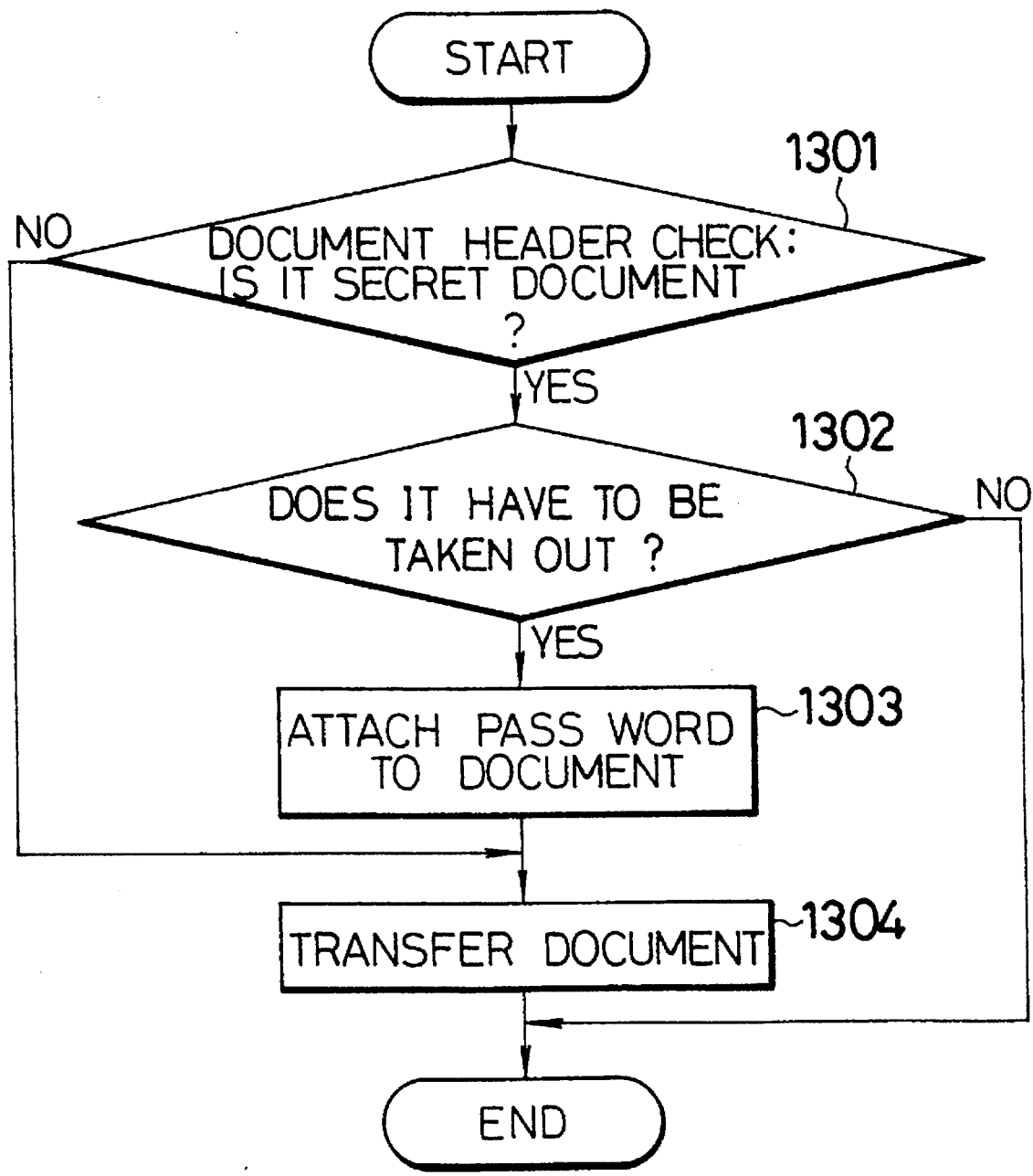
FIG. 12 is a flow chart for a secret protection operation at a time of transferring of the document in the display device of FIG. 1.

First, at a time of transferring the documents from the other computer to this display device 100, the operation according to the flow chart of FIG. 12 is carried out.

Namely, at the step 1301, the document header of each document to be transferred is checked to see if it is a secret document or not. If it is not a secret document, the document can be transferred straightforwardly at the step 1304.

In a case it is a secret document, next at the step 1302, the user is inquired if it must be taken out. If the user replies that it is not absolutely necessary to take it out, the process terminates without transferring the document.

In a case the user replies that it must be taken out, next at the step 1303, a pass word is attached to the document. Here, the user may be requested to enter the desired pass word, or the already registered pass word for this user may be used as the default setting.

Then, at the step 1304, the document is actually transferred into the document memory 14 of the display device 100.

On the other hand, at a time of reading the transferred documents by using this display device 100, the operation according to the flow chart of FIG. 13 is carried out.

First, at the step 1401, whether there is a pass word request attached to the document or not is checked when the reading of the document is attempted. IF there is no pass word request, the document can be displayed straightforwardly at the step 1405.

In a case there is a pass word request, next at the step 1402, the user is inquired if it is O.K. to read this document here. When the user judges that it is not O.K. to read this document here, the process terminates without displaying the document.

In a case the user judges that it is O.K. to read this document here, the input of the pass word is requested to the user at the step 1403, and the pass word is checked at the step 1404. Here, the pass word can be entered by pressing the alphanumerics displayed on the display screens with a finger or the electronic pen 10. In a case the entered pass word is a correct one, the document is displayed at the step 1405, whereas otherwise the process terminates without displaying the document.

Now, in this display device 100, either one of the operation of the operation buttons 4 to 7 or the input with a finger or the electronic pen 10 can be omitted.

In a case of using only the operation buttons 4 to 7, the manners of pressing of the operation buttons 4 to 7 can be changed in the command input and in the page manipulation. For example, any one of the operation buttons 4 to 7 can be pressed twice in succession, or two of the operation buttons 4 to 7 can be pressed in a case of the command input.

Figure 14A:
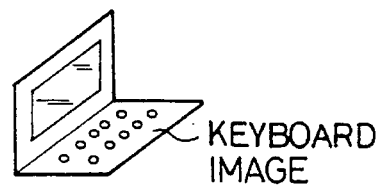
FIGS. 14A and 14B are illustrations of the display device of FIG. 1 displaying a keyboard image and a ten keys image.
Figure 14B:

On the other hand, in a case of using only the input with a finger or the electronic pen 10, it suffices to add the page manipulation entries in the menu. Alternatively, an image of the keyboard or the ten keys can be displayed on the display screen equipped with a pressure sensor as shown in FIGS. 14A and 14B, and the input with a finger or the electronic pen 10 can be carried out on the displayed image of the keyboard or the ten keys. This manner of input is also suitable in a case the use of the external keyboard is inconvenient such as an outdoor use of the display device 100.

It is also possible to change the number of the operation buttons to be provided on the display device 100. Here, however, in a case of providing only one operation button, it becomes necessary for the menu to be provided with the entries for specifying one of the left and right pages to be manipulated in the separate mode.

Moreover, the display device 100 may be equipped with the following additional functions.

Figure 15A:
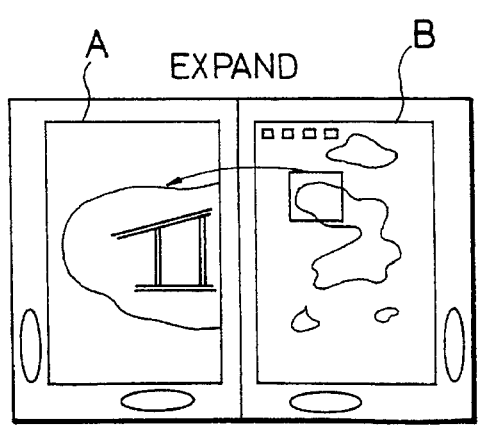
FIGS. 15A and 15B are illustrations of two displays in the separate mode in the display device of FIG. 1.
Figure 15B:
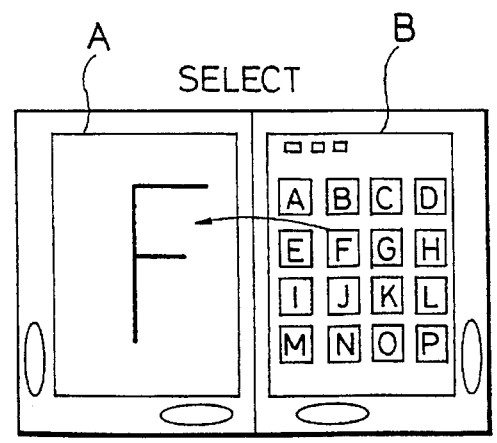
Figure 16:
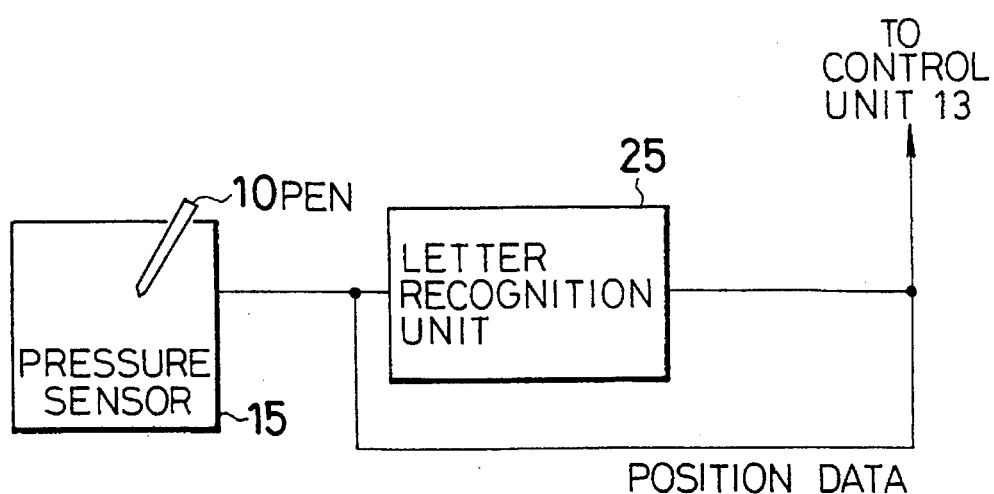
FIG. 16 is a block diagram of a pen input mechanism that can be incorporated in the display device of FIG. 1.

For example, in the separate mode, one side can be used for displaying the enlargement of a part of what is displayed on the other side, as shown in FIG. 15A in which a part of a map displayed on the display screen B is displayed in enlargement on the display screen A. Also, as shown in FIG. 15B, a number of pages of the document can be displayed in contraction on the display screen B and a desired one of these pages selected by the user on the display screen B can be displayed in the full size on the display screen A.

Also, in the separate mode, each display screen can be further divided into sections to display more than two documents simultaneously, or each display can incorporate the multi-window function allowing the overlapping windows. Such a display mode will be useful in displaying the references and dictionaries along with the document to be read, or in displaying a plurality of figures and tables together.

Furthermore, the electronic pen 10 can be utilized for the purpose other than the menu selection as described above. Namely, by incorporating a letter recognition unit 25 between the pressure sensor 15 and the control unit 13 in the display device 100, it becomes possible to carry out the command input or the handwriting memo input using the electronic pen 10.

Figure 17:
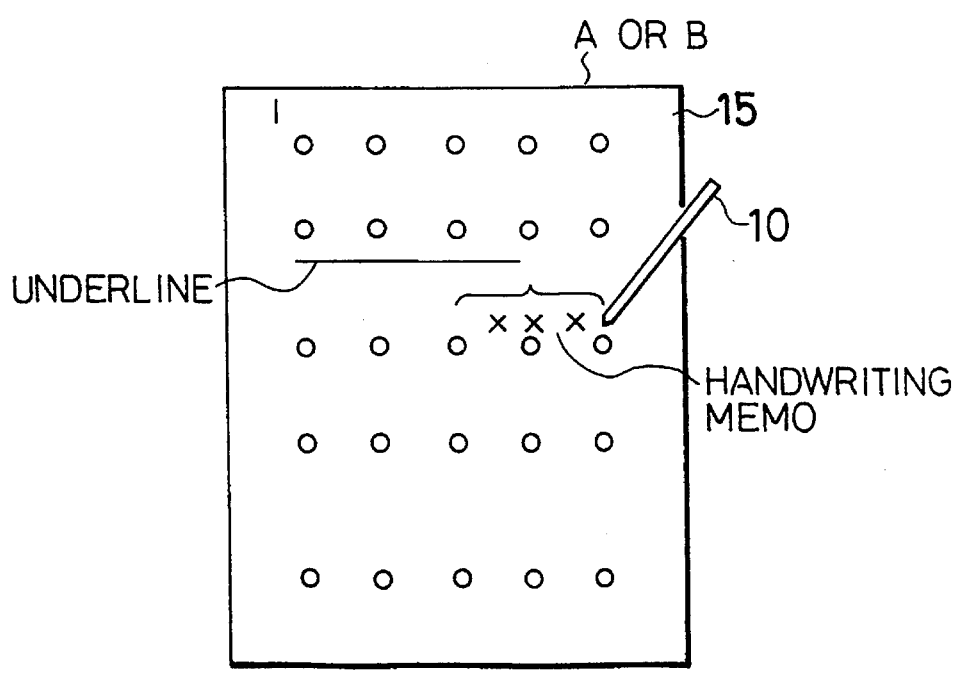
FIG. 17 is an illustration of entered pen inputs using the pen input mechanism of FIG. 16 in the display device of FIG. 1.
Figure 18:
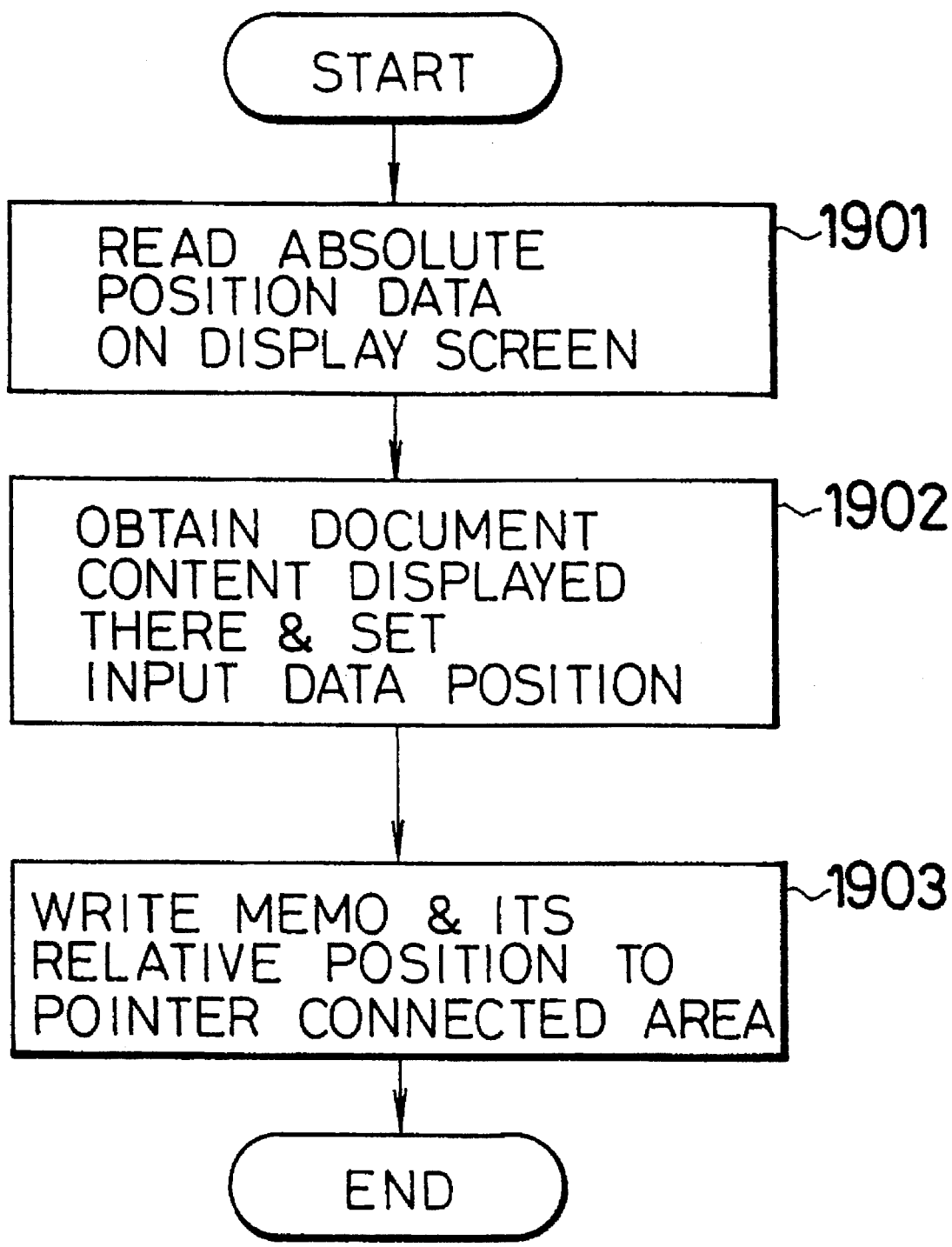
FIG. 18 is a flow chart for a pen input operation in the display device of FIG. 1.

For example, in order to enter the underline or the handwriting memo on the displayed document as shown in FIG. 17, either the letter recognition is carried out for the entered pen input, or the pen stroke is stored as it is. In a case the document is the read only document, the page and the position within that page of the entered pen input must be added to the recognition result or the pen stroke data, and stored in the appropriate file which is linked with that document. On the other hand, in a case the document is a rewritable one in which the addition of the entered pen input can change the positions of the parts of the document, the following processing according to the flow chart of FIG. 18 becomes necessary.

Namely, at the step 1901, the data of the absolute position on the display screen for the entered pen input is read, and at the step 1902, the document content displayed at that position is obtained. Then, at the step 1903, the memo and its relative position with respect to the document content are written into the document memory 14 connected with the document content by the pointer. Here, the relative position may be fixed to a predetermined default setting such as below the letters, instead of specifying it each time.

Figure 19A:
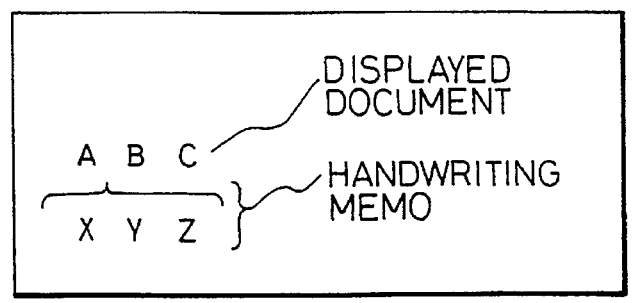
FIGS. 19A and 19B are illustrations of an entered pen input and a stored pen input data in the display device of FIG. 1.
Figure 19B:
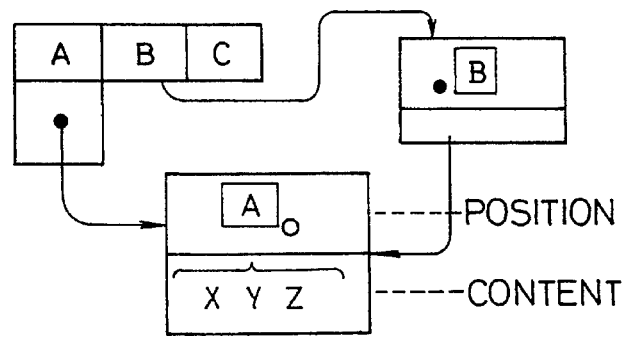

For example, when the memo consisting of "XYZ" and an insertion mark is to be written between letters "A" and "B" of the displayed letter series "ABC" as shown in FIG. 19A, the content of this memo is connected with the letter "A" portion of the document by a pointer as shown in FIG. 19B and recorded. The handwriting memo can be subjected to the letter recognition in order to record the recognition result, or recorded as it is as an image input.

In FIG. 19B, the relative position is indicated by a small circle at a foot of the letter "A". In addition, the link is provided for the letter "B" as well, in order to be able to cope with the subsequent deletion of the letter "A". Here, the memo is usually added in order to modify the document content, so that it is not so infrequent for the letters "A" and "B" in relation to which the memo is recorded are going to be deleted later on. For this reason, unless the user indicates that there is no need to preserve the memo, the position of the memo is going to be shifted automatically when the letters "A" and "B" are deleted. For example, the position of the memo can be shifted to a position at a foot of the letter "C" in a case the letters "A" and "B" are deleted.

Also, in the above explanation, the letter series "XYZ" is treated collectively, but the underline or the memo letter series may be recorded in parts with respect to the nearest displayed document letters. For example, the underline drawn below the displayed document letter series "ABC" can be recorded in three parts with respect to each of the letters "ABC". This provision is especially useful for the underline as the significance of the underline is likely to be preserved even when there is a long memo added to the underlined letter series.

Figure 20:
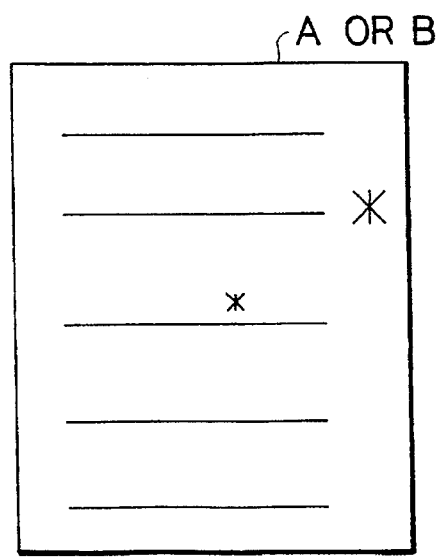
FIG. 20 is an illustration of a display with pen input marks in the display device of FIG. 1.

In a case of reading out the document with the memo or the underline attached, the default setting is to read the attached memo or underline along with the document. However, in a case it is undesirable to read the attached memo or underline, it is also possible to display the document alone, without displaying the attached memo or underline. In such a case, it is also possible to indicate the presence of the memo or underline on the displayed document by means of a prescribed marks such as star marks shown in FIG. 20.

In this embodiment, the display device 100 uses a liquid crystal display with a background lighting for each of the display screens A and B, but the other planar display such as a plasma display may be used instead. It is also possible to employ the different types of planar displays for the left and right display screens A and B. For example, one display screen may adopt a color liquid crystal display while the other display screen adopts a monochromatic liquid crystal display which is cheaper than the color liquid crystal display. In this case, in the separate mode, when the code for requiring the color display provided in the document data is detected, or when the color page is recognized from the recording format of the document, the color page can be allocated to the side adopting the color liquid crystal display. Also, in a case the letter portions are monochromatic but the figure portions are colored, each page of the document can be provided with a page header indicating the presence or absence of the colored portion within each page, so that the page containing the colored portion can be allocated to the side adopting the color liquid crystal display. For the document without such a page header, the presence or absence of the colored portions can be checked before the actual display of each page, and then this information is recorded in the document data in the document memory 14 for the sake of the subsequent display occasions. Alternatively, the document data to be stored in the document memory 14 may be subjected to this checking operation in advance, either by using this display device 100 or the other device capable of carrying out the same operation, such that there is no need to carry out this checking operation at a time of actual display and therefore the proper display can be obtained more quickly.

In addition, it is also possible to use the display screen equipped with a pressure sensor for the sake of the pen input only on one side, in order to reduce the cost of the display device 100. In such a case, however, when the pen input on the document is required, tile document must be moved to the area equipped with the pressure sensor.

It is to be noted that the display device 100 of this embodiment can handle the documents in the lateral writing as well as the documents in the vertical writing.

It is also to be noted that many modifications and variations of the above embodiments may be made without departing from the novel and advantageous features of the present invention. Accordingly, all such modifications and variations are intended to be included within the scope of the appended claims.

What is claimed is:

1. A display device, comprising:

document memory means for storing documents to be displayed;

at least two display screens for displaying the documents stored in the document memory means; and display control means for controlling displays of the documents on the display screens to be in a predetermined linked mode in which the displays on the display screens are linked together to display consecutive pages of a document and in a predetermined separate mode in which the displays on the display screens are independent from each other such that any page of the document can be displayed on any display screen, wherein the linked mode further includes an all sides switching mode in which each page displayed on each one of the display screens is simultaneously switched to another page and a one side switching mode in which only one page displayed on one of the display screens is switched at a given time while other displayed pages are unchanged.

2. The display device of claim 1, wherein the display control means also controls the display screens to make a widened display in which a single display is displayed by the display screens collectively.

3. The display device of claim 2, wherein the display control means automatically controls the display screens to make the widened display In response to a code requiring the widened display provided on a page of the documents displayed on the display screens.

4. The display device of claim 2, wherein the display control means shifts a displayed content of one of the display screens to displace letters in the displayed content from a border of the display screens.

5. The display device of claim 4, wherein the display control means shifts the entire displayed content parallely to displace a line of the letters in the displayed content from the border.

6. The display device of claim 4, wherein the display control means shifts an isolated letter series in the displayed content to displace every letter of the isolated letter series from the border.

7. The display device of claim 4, wherein the display control means shifts the displayed content of said one of the display screens only when each of the letters displaced from the border by a shifting of the displayed content is smaller than a prescribed size.

8. The display device of claim 4, wherein the displayed content shifted by the display control means is recorded in the document memory means in a state of being shifted.

9. The display device of claim 1, wherein the display screens are attached with each other to be foldable face to face as well as back to back.

10. The display device of claim 9, further comprising a switch means for inactivating one of the display screens when the display screens are folded back to back.

11. The display device of claim 1, wherein each one of the display screens is capable of being activated/inactivated separately.

12. The display device of claim 1, further comprising mode selection means for allowing a user to select one of the linked mode and the separate mode on the display screens.

13. The display device of claim 12, wherein the mode selection means also allows a user to select the linked mode to be in one of the all sides switching mode and the one side switching mode.

14. The display device of claim 1, further comprising secret protection means for attaching a pass word to a document to be displayed when the document is stored in the document memory means, and checking a matching of the pass word attached to the document with a pass word input made by a user at a time of displaying of the document on the display screens.

15. The display device of claim 1, further comprising command input means for allowing a user to enter commands for operating the display device in forms of keys displayed on the display screens.

16. The display device of claim 1, wherein one of the display screens displays an enlargement of a part of a displayed content displayed on another one of the display screens.

17. The display device of claim 1, wherein one of the display screens displays a number of pages of the documents in a contracted size and another one of the display screens displays a selected one of the pages in a full size.

18. The display device of claim 1, further comprising handwriting input means for allowing a user to enter a handwriting input with respect to a document displayed on the display screens.

19. The display device of claim 18, wherein the handwriting input entered by the user using the handwriting input means is recorded in the document memory means, in relation to displayed contents of the document displayed on the display screens.

20. The display device of claim 18, wherein the display control means also controls the display screens to display a handwriting input indication mark indicating a presence of the handwriting input entered by the user using the handwriting input means on the document displayed on the display screens.

21. A display device comprising:

a memory for storing documents;

at least two display screens coupled to the memory, the display screens displaying documents stored in the memory; and a display control unit coupled to the memory and the display screens, the display control unit controlling the display screens such that the display screens are in one of a predetermined linked mode and a predetermined separate mode, the display screens being linked together when in the linked mode to display consecutive pages and the display screens changing independently when in the separate mode such that any page of the document can be displayed on any display screen, wherein the control unit further controls the display screens when in the linked mode such that the display screens are in one of an all sides switching mode and a one side switching mode, all of the display screens changing simultaneously when in the all sides switching mode and only one display screen changing at any given time when in the one side switching mode.

22. A method of displaying stored documents on a plurality of display screens comprising the steps of:

controlling the display screens, via a control unit, such that the display screens are in one of a predetermined linked mode and a predetermined separate mode, the linked mode corresponding to all of the display screens being linked together to display consecutive pages and the separate mode corresponding to the display screens changing independently such that any page of the document can be displayed on any display screen;

controlling the display screens, via the control unit, when the display screens are in the linked mode, such that the display screens are further in one of an all sides switching mode and a one side switching mode, the all sides switching mode corresponding to all of the display screens changing simultaneously and the one side switching mode corresponding to only one display screen changing at a given time;

displaying the stored documents on the display screens; and changing the displays on the display screens in accordance with the mode of the display screens.

* * * * *